US010576958B2

(12) United States Patent
Wolff et al.

(10) Patent No.: US 10,576,958 B2
(45) Date of Patent: Mar. 3, 2020

(54) METHOD FOR DETERMINING A LEAKAGE IN A HYDRAULIC BRAKE SYSTEM

(71) Applicant: Robert Bosch GmbH, Stuttgart (DE)

(72) Inventors: Helmut Wolff, Untergruppenbach (DE); Dieter Blattert, Kirchheim/Neckar (DE); Edith Mannherz, Weinsberg (DE)

(73) Assignee: Robert Bosch GmbH, Stuttgart (DE)

( * ) Notice: Subject to any disclaimer, the term of this patent is extended or adjusted under 35 U.S.C. 154(b) by 58 days.

(21) Appl. No.: 15/667,186

(22) Filed: Aug. 2, 2017

(65) Prior Publication Data

US 2018/0050678 A1 Feb. 22, 2018

(30) Foreign Application Priority Data

Aug. 17, 2016 (DE) .................. 10 2016 215 293

(51) Int. Cl.
*B60T 7/08* (2006.01)
*B60T 8/18* (2006.01)
*B60T 8/48* (2006.01)
*B60T 13/74* (2006.01)
*B60T 17/22* (2006.01)

(52) U.S. Cl.
CPC .......... *B60T 17/226* (2013.01); *B60T 13/741* (2013.01); *B60T 17/22* (2013.01); *B60T 7/085* (2013.01); *B60T 8/1881* (2013.01); *B60T 8/4872* (2013.01); *B60T 17/221* (2013.01); *B60T 17/225* (2013.01)

(58) Field of Classification Search
CPC ..... B60T 7/08; B60T 8/00; B60T 8/18; B60T 8/48; B60T 13/74; B60T 13/741; B60T 13/586; B60T 13/665; B60T 13/686; B60T 17/22; B60L 7/24
USPC ....................................... 303/3, 10
See application file for complete search history.

(56) References Cited

U.S. PATENT DOCUMENTS

| | | | | |
|---|---|---|---|---|
| 2004/0243290 A1* | 12/2004 | Schmidt | ................. | B60T 8/442 701/29.2 |
| 2005/0146211 A1* | 7/2005 | Nakano | .................... | G01L 5/28 303/122.08 |
| 2006/0066146 A1* | 3/2006 | Otomo | ..................... | B60T 8/26 303/151 |
| 2012/0126610 A1* | 5/2012 | Nakata | ..................... | B60T 1/10 303/9.63 |
| 2013/0035835 A1* | 2/2013 | Hachtel | ................ | B60T 8/3265 701/70 |
| 2014/0150880 A1* | 6/2014 | Rousseau | ............. | F04B 49/002 137/2 |

(Continued)

FOREIGN PATENT DOCUMENTS

DE   10 2004 062 824 A1   7/2006
DE   10 2011 004 772 A1   8/2012

*Primary Examiner* — Robert A. Siconolfi
*Assistant Examiner* — San M Aung
(74) *Attorney, Agent, or Firm* — Maginot, Moore & Beck LLP

(57) ABSTRACT

A method for determining a leakage in a hydraulic brake system in a vehicle includes evaluating a suspected leakage in the hydraulic brake system and taking into account an actuation of an automated hand brake during the evaluation of the suspected leakage. The hydraulic brake system has a hydraulic footbrake and the automated hand brake has an electromechanical actuator. The hydraulic footbrake and the automated hand brake are configured to act on the same brake piston.

13 Claims, 4 Drawing Sheets

(56) References Cited

U.S. PATENT DOCUMENTS

2016/0059839 A1* 3/2016 Nanahara .............. B60T 17/221
　　　　　　　　　　　　　　　　　　　　　73/39

* cited by examiner

METHOD FOR DETERMINING A LEAKAGE IN A HYDRAULIC BRAKE SYSTEM

This application claims priority under 35 U.S.C. § 119 to patent application no. DE 10 2016 215 293.9, filed on Aug. 17, 2016 in Germany, the disclosure of which is incorporated herein by reference in its entirety.

BACKGROUND

The present disclosure relates to a method for determining a leakage in a hydraulic brake system in a vehicle comprising a hydraulic footbrake and an automated hand brake, wherein the hand brake comprises an electromechanical actuator and acts on the same brake piston as the footbrake, wherein the method is characterized in that an actuation of the automated hand brake is taken into account in an evaluation of a suspected leakage. In addition, a device, a computer program, and a memory medium are provided.

So-called motor-on-caliper hand brakes are known from the prior art, such as, for example, from the patent application DE 10 2011 004 772 A1.

In addition, the patent application DE 10 2004 062 824 A1 is known from the prior art. This document relates to a method for checking the hand brake. The method is used for checking the proper performance of the pressure build-up in the hand brake. As a result, it is also possible to detect a circuit failure (a leakage in a brake line). For this purpose, the brake pressure is preferably brought to a high level (wherein the auxiliary piston is lifted) and an attempt is made to move the locking element which is preferably in the start position. Depending on whether the locking element can be moved or not, it is possible, in turn, to infer whether the pressure build-up is performing properly or whether there is a defect in the brake circuit. The cited document relates to a so-called APB-H, however, i.e., a parking brake which builds up the necessary holding pressure via application of hydraulic pressure. Monitoring systems that can detect leakages in the case of APB-H are therefore known from the prior art. Such methods cannot be applied to modern motor-on-caliper (MoC) APBs since the design does not contain the same components.

Since the piston moves and, therefore, volume is displaced during the build-up of clamping force in MoC hand brakes, however, monitoring systems such as, for example, leakage monitoring, can become active upon actuation of the MoC hand brake.

SUMMARY

Advantageously, the method according to the disclosure prevents a false error message during the observation of leakage. This is made possible according to the features of the descriptions, drawings, and claims. Refinements are provided by additional features of the descriptions, drawings, and claims.

The method according to the disclosure for determining a leakage in a hydraulic brake system in a vehicle comprising a hydraulic footbrake and an automated hand brake, wherein the hand brake comprises an electromechanical actuator and acts on the same brake piston as the footbrake, is characterized in that an actuation of the automated hand brake is taken into account in an evaluation of a suspected leakage.

This is understood to mean that the method is suitable for evaluating whether a suspected leakage is an actually present leakage. The determination of an actual leakage can therefore comprise, for example, the two steps of: (A) Detecting a possible leakage by means of standard methods, such as, for example, measuring the hydraulic pressure. Since the results of such methods are affected by a certain amount of uncertainty, however, this is referred to as a suspected leakage. (B) Analysing the suspected leakage on the basis of further factors and determining whether this is an actual leakage or if the detected suspected leakage may have other causes. In this case, the suspected leakage would not be confirmed and would be discarded. An actuation of the automatic hand brake results, for example, in a build-up of clamping force. In this case, the brake piston, in particular, is moved in the direction of the brake disk. As a result, a displacement of hydraulic volume takes place. Such a displacement can be the reason, for example, for the suspected leakage that was detected. The method of the analysis and evaluation according to the disclosure can therefore be utilized as a downstream expansion of existing methods for determining a leakage. In addition, the method is designed for MoC hand brakes.

According to the disclosure, it is now provided to check, during the evaluation, whether an actuation of the automatic hand brake is present. This information should also be used in the analysis of the suspected leakage. In the case of a detected actuation of the automated hand brake, it is not assumed that there is a leakage, but rather the actuation of the automated hand brake is assumed to be the cause of the detected pressure loss. In the following, for example, no further procedural steps, such as, for example, warning the driver or initiating automated interventions into the brake system, would be carried out in this case. Different variables can be analysed and taken into account in order to detect an actuation of the hand brake. Suitable possibilities therefor, in addition to the aforementioned force measurement or fluid displacement, are variables, for example, related to the activation of the electric motor-driven actuator, such as, for example, current variables, etc.

The correlation between brake fluid volume and brake pressure is fundamental for the implementation. This means, in the isobaric (=brake pressure is constant) state, no additional volume should be necessary in order to hold the applied brake force constant (the driver does not press down again). In the isochoric (=volume is constant) state, there must be no pressure drop (the pressure sensor displays a constant value). The problem with a build-up or reduction of clamping force is that volume is displaced as a result, which influences the pressure/volume balance. In the case of a clamping process, a leakage could be wrongly detected, since a larger volume is required and so the pressure in the system drops. The opposite takes place in the case of a release process, i.e., a leakage is not detected here, although other monitoring systems could respond (this case will not be considered further). This means that, in the case of a detected leakage, a check must be carried out to determine whether this is actually an error or a build-up of clamping force of the parking brake.

Advantageously, by accounting for the actuation of the hand brake in the evaluation of the suspected leakage, it is possible to prevent the leakage monitoring from being stopped during a hand brake process. As a result, the possibility for utilizing and applying the leakage monitoring is expanded. A higher level of safety can also be achieved as a result.

The method can also be advantageously utilized in the situation in which the automated hand brake is hydraulically supported during a generation of clamping force. The automated hand brake can, in this case, a hydraulic actuator for generating a hydraulic force component and an electromagnetic actuator for generating an electromagnetic force component, wherein the hydraulic force component and the electromechanical force component are superimposed in order to achieve an overall clamping force for the hand brake process.

In one advantageous embodiment, the method is characterized in that, in the evaluation of the suspected leakage, a defect in the brake system is not detected, but rather, in particular, a regular hand brake process is detected when an actuation of the automated hand brake is detected.

In this case, it is understood that it can be inferred from the detection of an actuation of the hand brake that the determined suspected leakage is based on a movement of the components of the hand brake. If an actuation of the hand brake is not detected, however, it is inferred, for example, that the determined suspected leakage is an actual leakage, i.e., there is a defect in the brake system. Advantageously, the diagnostic quality of the leakage determination is optimized as a result. In addition, incorrect evaluations are reduced, as are incorrect warnings or error entries. An increase in user acceptance also results.

Several conditions can be checked for this purpose. In this case, it is possible that even a single (for example, non-fulfilled) condition results in the determination that it is an actual leakage. In contrast, it is possible, in particular, that only multiple (for example, fulfilled) conditions result in the determination that a hand brake is the actual reason, i.e., the suspicion of a leakage can be discarded.

In one possible embodiment, the method is characterized in that the actuation of the automatic hand brake is detected independently of an activation of the electromechanical actuator of the automated hand brake.

This is understood to mean that a check to determine whether the hand brake is presently being activated takes place in such a way that this check takes place without consideration for the actual activation variables of the hand brake such as, for example, current and voltage of the electromechanical actuator. Likewise, no variables are taken into account in this case that can be derived or determined only from the hand brake itself, such as, for example, the travel of the spindle nut, etc. The hand brake itself is frequently a purchased element and is delivered by different suppliers. Due to the method described, the need for information on such foreign components can be advantageously dispensed with. Instead, the check is carried out to determine whether the hand brake is active, for example, on the basis of signals and information from the means and devices of the ESP or IPB system (such as, for example, the ESP pump). Alternatively, information from the wheel speed sensors or pressure sensors in the brake system, etc., can also be used. Advantageously, monitoring of the hydraulic system is therefore made possible without relying on external signals. As a result, it is possible to use different hand brakes of the motor-on-caliper type from different manufacturers and to simultaneously keep the application complexity low.

In one preferred embodiment, the method is characterized in that an actuation of the automated hand brake is detected when a displacement of hydraulic volume, in particular in a brake piston, is detected.

This is understood to mean that a check is carried out in the evaluation to determine whether a displacement of hydraulic volume due to the actuation of the automated hand brake is present. In this case, a detection of a displacement of hydraulic volume results in the assumption that an actuation of the automated hand brake can be the cause. In this case, there are various possibilities for determining a displacement of hydraulic volume, for example, by means of pressure sensors, fluid motion sensing, movement monitoring of concurrently moving components, etc. Advantageously, a high level of certainty with respect to distinguishing between actual leakages and other causes can be achieved by means of these approaches, without the need to rely on data regarding foreign components, as described above.

In one alternative refinement, the method is characterized in that an actuation of the automated hand brake is detected when a standstill of the vehicle is detected, wherein, in particular, a standstill is determined on the basis of the vehicle speed, wherein, in particular, the vehicle speed is determined by means of wheel speed sensors.

This is understood to mean that it is assumed that a detected suspected leakage is a setting of the hand brake when a standstill of the vehicle is detected. The hand brake is frequently already automatically activated in order to secure a vehicle at a standstill. This is improved by integrating this knowledge or assumption into the method. Advantageously, available sensors and evaluations can be used in this case. Results having acceptable quality are already obtained in this case and the implementation is simple.

In one advantageous embodiment, the method is characterized in that an actuation of the automated hand brake is detected when a leakage is suspected in both brake circuits in the case of a diagonal configuration of the hydraulic brake system.

This is understood to mean that, in the case of a diagonal configuration of the brake system (RR+FL and RL+FR), a detection of a suspected leakage in both circuits results in the assumption that an actuation of the automated hand brake can be the cause. Correspondingly, a detection of a suspected leakage in only one of the two circuits results in the determination that there is an actual leakage in this brake circuit. This approach advantageously results in a high probability for a correct distinction between an actual leakage and a hand brake.

In one possible embodiment, the method is characterized in that an actuation of the automated hand brake is detected when a leakage is suspected in the brake circuit assigned to the hand brake in the case of a parallel configuration of the hydraulic brake system.

This is understood to mean that, in the case of a parallel configuration of the brake system (RR+RL and FL+FR) and a positioning of the hand brake at a rear wheel or the rear axle, a detection of a suspected leakage in the rear brake circuit leads to the assumption that an actuation of the automated hand brake can be the cause. Correspondingly, a detection of a suspected leakage in the front circuit (in the same system design) leads to the determination that there is an actual leakage in this brake circuit.

Similarly, in the case of a positioning of the hand brake at a front wheel or the front axle, a detection of a suspected leakage in the front brake circuit leads to the assumption that an actuation of the automated hand brake can be the cause. Correspondingly, a detection of a suspected leakage in the rear circuit (in the same system design) leads to the determination that there is an actual leakage in this brake circuit.

Advantageously, this approach results in a good possibility for distinguishing between an actual leakage and a hand brake.

In one preferred embodiment, the method is characterized in that an actuation of the automated hand brake is detected when a period of time of the suspected leakage does not exceed a defined period of time.

This is understood to mean that the period of time of the identified suspected leakage is determined and evaluated. If the determined time period is below a defined limit value, however, this leads to the assumption that an actuation of the automated hand brake can be the cause. A possible time period would be in the magnitude of 1 second. If the time period exceeds this limit, however, this results in the determination that this is an actual leakage. Advantageously, this criterion results in an improved quality of results and a good possibility for distinguishing between an actual leakage and a hand brake.

In one alternative embodiment, the method is characterized in that an actuation of the automated hand brake is detected when a volumetric flow rate of the suspected leakage is essentially constant.

This is understood to mean that a determination of a constant volumetric flow rate leads to the assumption that an actuation of the automated hand brake can be the cause. In contrast, the detection of a non-constant volumetric flow rate leads to the determination that this is an actual leakage. The relatively simple measurement is advantageous in this case. In particular, a high diagnostic quality results when the volumetric flow rate of the suspected leakage is compared with stored possible volumetric flow rates of the hand brake.

In one advantageous embodiment, the method is characterized in that an error is entered in an error memory and/or a message is output to a driver when a leakage is confirmed.

This is understood to mean that, when an automated action takes place when the suspected leakage is confirmed, this means that an actual leakage is determined. Advantageously, a corresponding action takes place only in the event of such a confirmation. As a result, not only can the safety be improved (read out the error memory during the next workshop visit as well as analysis and repair), but also the user's understanding for the processes and the user acceptance are increased.

In one possible embodiment, the method is characterized by at least one of the following steps of:
  determining a suspected leakage in the brake system,
  determining whether the vehicle is at a standstill,
  determining the brake circuit at which the suspected leakage is occurring,
  determining the time period in which the suspected leakage is occurring,
  determining the volumetric flow rate at which the suspected leakage is occurring,
  determining whether the suspected leakage is a defect of the brake system or is caused by an actuation of the hand brake, and
  entering an error in the error memory and/or outputting a message to the driver if the suspected leakage is a defect of the brake system.

This is understood to mean which steps one exemplary embodiment of the method can comprise. For example, a method comprises all the aforementioned steps. Advantageously, this results in optimized leakage monitoring. Incorrect evaluations can also be reduced to a minimum. The result, therefore, is a precise possibility to distinguish between an actual leakage and other causes (for example, an actuation of the hand brake).

According to the disclosure, a device is also provided, which is configured for carrying out the method described.

This is understood to mean that the device is designed for carrying out the method described when used as intended. A control unit and/or sensors can be considered to be the device. A control device for determining a leakage in a hydraulic brake system in a vehicle comprising an automated hand brake, characterized in that the control unit is designed for taking an actuation of the automated hand brake into account when evaluating a suspected leakage.

According to the disclosure, a computer program is also provided, which is configured for carrying out the method described, as well as a machine-readable memory medium on which the computer program is stored.

It should be noted that the features mentioned individually in the description can be combined with one another in any technically reasonable manner and can reveal further embodiments of the disclosure.

BRIEF DESCRIPTION OF THE DRAWINGS

Further features and the practicality of the disclosure result from the description of exemplary embodiments with reference to the attached figures.

In the figures.

DETAILED DESCRIPTION

Figure 1:
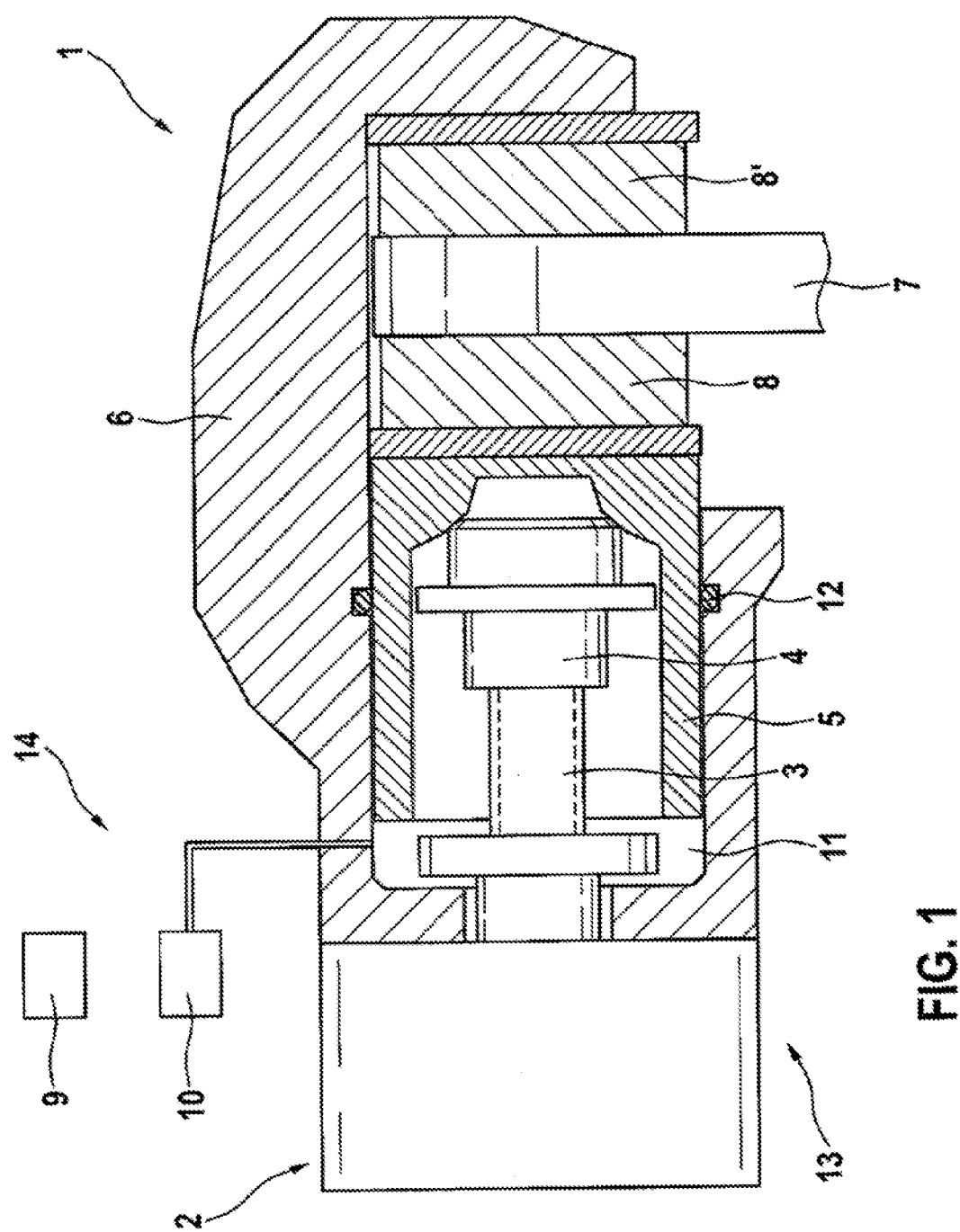
FIG. 1 shows a schematic sectional view of a brake device comprising an automatic hand brake having a "motor-on-caliper" design.

FIG. 1 shows a schematic sectional view of a brake device 1 for a vehicle. The brake device 1 in this case comprises an automated hand brake 13 (also automatic hand brake or automated parking brake, APB for short) which can exert a clamping force by means of an electromechanical actuator 2 (electric motor) in order to fix the vehicle in position. For this purpose, the electromechanical actuator 2 of the represented hand brake 13 drives a spindle 3, in particular a threaded spindle 3, which is mounted in an axial direction. On the end thereof facing away from the actuator 2, the spindle 3 is provided with a spindle nut 4 which rests against the brake piston 5 in the clamped state of the automated hand brake 13. In this way, the hand brake 13 transmits a force onto the brake pads 8, 8' and the brake disk 7. The spindle nut rests against an inner end face of the brake piston 5 (also referred to as the back side of the brake piston base or the inner piston base) in this case. The spindle nut 4 is displaced in the axial direction during a rotary motion of the actuator 2 and a resultant rotary motion of the spindle 3. The spindle nut 4 and the brake piston 5 are mounted in a brake caliper 6 which engages over a brake disk 7 in the manner of a gripping device.

One brake pad 8, 8' is situated on either side of the brake disk 7. In the case of a clamping process of the brake device 1 by means of the automated hand brake 13, the electric motor (actuator 2) rotates, whereupon the spindle nut 4 and the brake piston 5 are moved in the axial direction toward the brake disk 7, in order to thereby generate a predetermined clamping force between the brake pads 8, 8' and the brake disk 7. Due to the spindle drive and the associated self-locking, a force generated in the case of the hand brake 13 by means of an activation of the electric motor is retained even after a termination of the activation.

The automated hand brake 13 is designed, for example, as a "motor-on-caliper" system and is combined with the footbrake 14. One could also consider the hand brake 13 to be integrated into the system of the footbrake 14. Both the automated hand brake 13 and the footbrake 14 act on the same brake piston 5 and the same brake caliper 6 in order to build up a braking force on the brake disk 7. The footbrake 14 comprises a separate hydraulic actuator 10, however, for example, a foot brake pedal comprising a brake power assist unit. The footbrake 14 is designed as a hydraulic system in FIG. 1, wherein the hydraulic actuator 10 can be assisted by the ESP pump or an electromechanical brake power assist unit (for example, the Bosch iBooster) or can be implemented thereby. Further embodiments of the actuator 10 are also conceivable, for example, in the form of a so-called IPB (Integrated Power Brake) which is a brake-by-wire system, in principle, in which a plunger is utilized in order to build up hydraulic pressure. Upon actuation of the footbrake, a predetermined clamping force between the brake pads 8, 8' and the brake disk 7 is built up hydraulically. In order to build up a braking force by means of the hydraulic footbrake 14, a medium 11, in particular an essentially incompressible brake fluid 11, is pressed into a fluid chamber delimited by the brake piston 5 and the brake caliper 6. The brake piston 5 is sealed with respect to the surroundings by means of a piston sealing ring 12.

The activation of the brake actuators 2 and 10 takes place by means of one or more output stages, i.e., by means of a control unit 9 which can be, for example, a control unit of a stability system, such as ESP (electronic stability program) or any other type of control unit.

In the case of an activation of the automated hand brake 13, the idle travel or the clearance must be overcome before a braking force can be built up. The idle travel is considered to be the distance, for example, that the spindle nut 4 must cover, via the rotation of the spindle 3, in order to come into contact with the brake piston 5. The clearance is considered to be the distance between the brake pads 8, 8' and the brake disk 7 in disk-brake systems of motor vehicles. This process lasts for a relatively long time, in general, relative to the overall activation, in particular of the automated hand brake 13. At the end of such a preparation phase, the brake pads 8, 8' rest against the brake disk 7 and the force build-up begins in a further method. FIG. 1 shows the state of the idle travel and the clearance, which have already been overcome. In this case, the brake pads 8, 8' rest against the brake disk 7 and all brakes, i.e., the hand brake 13 as well as the footbrake 14, can immediately build up a braking force at the corresponding wheel in a subsequent activation. The descriptions of the clearance also apply similarly for the footbrake 14, wherein overcoming idle travel requires less time than is the case with the hand brake 13, however, due to the high dynamics of pressure build-up.

Figure 2:
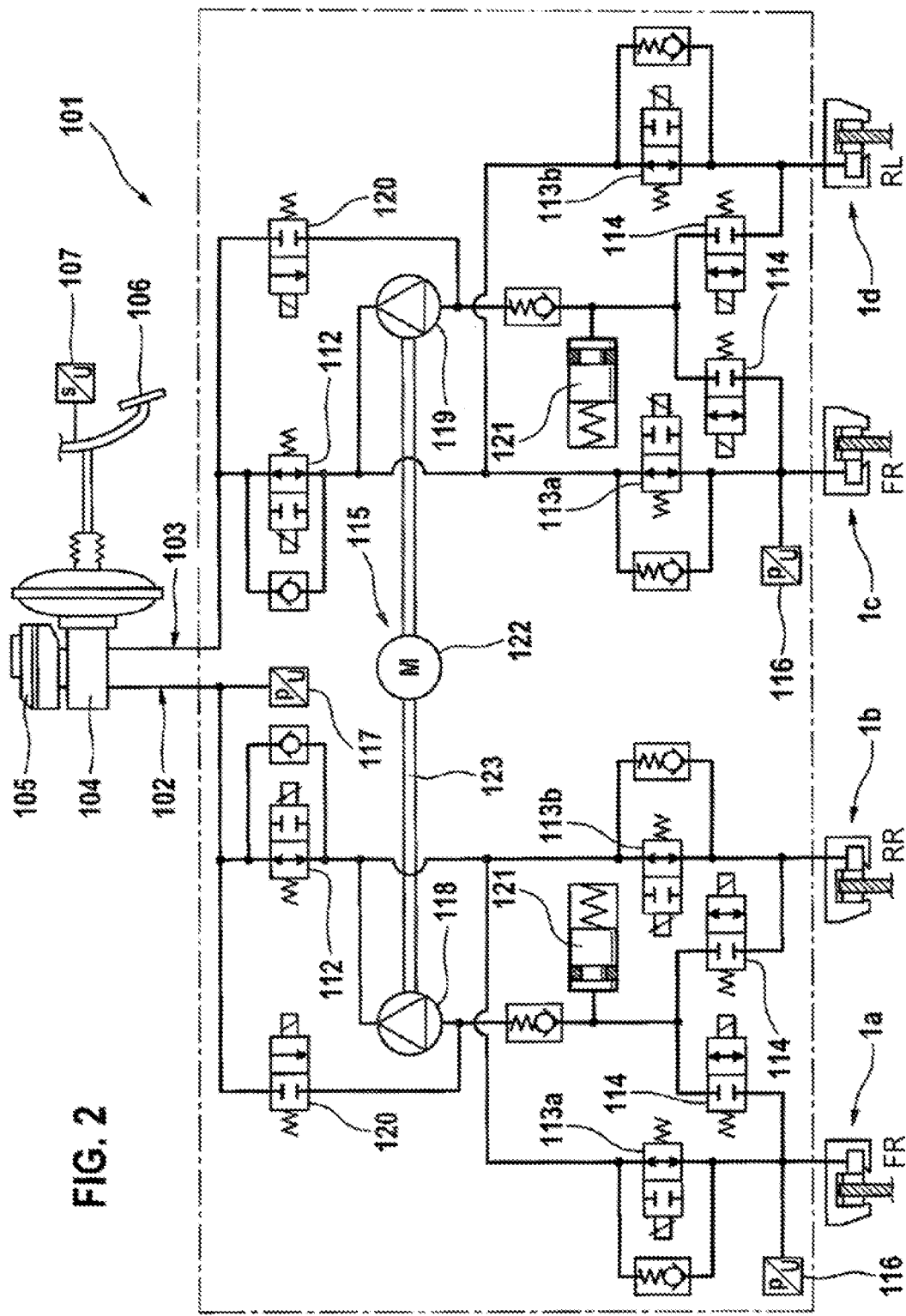
FIG. 2 shows a hydraulic circuit diagram of a vehicle brake system having a diagonal configuration and comprising an ESP system.

The hydraulic brake system, which is represented in the hydraulic circuit diagram according to FIG. 2 and is situated in a brake system 101, comprises a first brake circuit 102 and a second brake circuit 103 for supplying hydraulic brake fluid to wheel brake devices 1a and 1c at the front wheels and to wheel brake devices 1b and 1d at the rear wheels. In this sense, the brake system shown has a diagonal configuration. Alternatively, a parallel configuration (II configuration) of the brake circuits of the brake system is also similarly possible, of course. The two brake circuits 102, 103 are connected to one shared main brake cylinder 104 which is supplied with brake fluid via a brake fluid reservoir 105. The main brake cylinder 104 is actuated by the driver via the brake pedal 106. The pedal travel applied by the driver is measured via a pedal travel sensor 107 in the embodiment shown.

A switching valve 112 is situated in each brake circuit 102, 103 and lies in the flow path between the main brake cylinder 104 and the particular wheel brake devices 1a and 1b, or 1c and 1d, respectively. The switching valves 112 are open in their currentless normal position. Assigned to each switching valve 112 is a check valve which is connected in parallel thereto and through which fluid can flow in the direction of the particular wheel brake devices. Located between the switching valves 112 and the particular wheel brake devices 1a, 1b and 1c, 1d are inlet valves 113a of the front wheels and inlet valve 113b of the rear wheels, which are likewise open in the currentless state, and to which check valves are assigned, through which fluid can flow in the opposite direction, i.e., from the wheel brake devices in the direction toward the main brake cylinder.

Assigned to each wheel brake device 1a, 1b and 1c, 1d is an outlet valve 114 which is closed in the currentless state. The outlet valves 114 are each connected to the intake side of a pump unit 115 which comprises a pump 118 or 119 in each brake circuit 102, 103, respectively. Assigned to the pump unit is an electrical drive or pump motor 122 which actuates both pumps 118 and 119 via a shaft 123. The pressure side of the pump 118 or 119 is connected to a line section between the switching valve 112 and the two inlet valves 113a, 113b per brake circuit.

The intake sides of the pumps 118 and 119 are each connected to a main switching valve 120 which is hydraulically connected to the main brake cylinder 104. In the case of a control intervention into driving dynamics, in order to rapidly build up brake pressure, the main switching valves 120, which are closed in the currentless state, are opened, and therefore the pumps 118 and 119 draw hydraulic fluid directly out of the main brake cylinder 104. This brake pressure build-up can be carried out independently of an actuation of the brake system by the driver. The pump unit 115 comprising the two individual pumps 118 and 119, the electrical pump motor 122, and the shaft 123 belongs to a driver assistance system and forms, in particular, an electronic stability program (ESP).

A hydraulic accumulator 121 is located between the outlet valves 114 and the intake side of the pumps 118 and 119 in each brake circuit 102, 103 and is used for the intermediate storage of brake fluid which is released from the wheel brake devices 1a, 1b and 1c, 1d by the outlet valves 114 during an intervention into the driving dynamics. Assigned to each hydraulic accumulator 121 is a check valve which opens in the direction of the intake sides of the pumps 118, 119. In the embodiment shown, a pressure sensor 116 is located in each brake circuit 102, 103 in the region of the wheel brake devices 1a, 1b and 1c, 1d for the purpose of measuring pressure. One further pressure sensor 117 is situated in the brake circuit 102 adjacent to the main brake cylinder 104.

Figure 3:
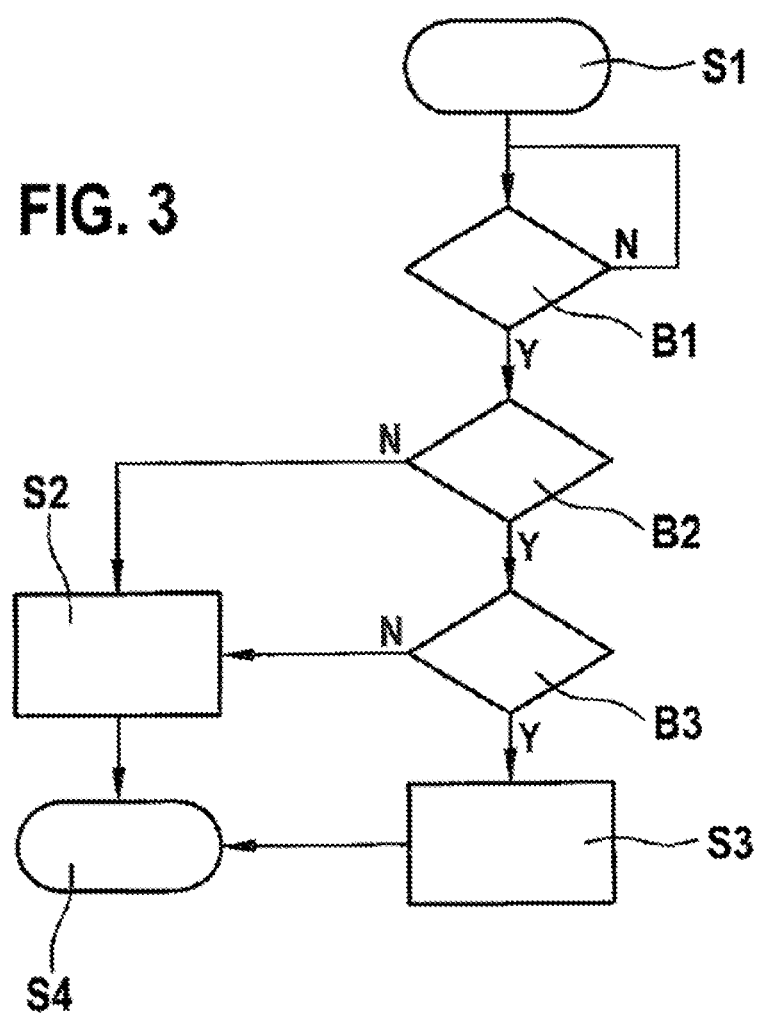
FIG. 3 shows a representation of the method steps in one embodiment of the disclosure.

A representation of the method steps of one embodiment of the disclosure is shown in FIG. 3. In this case, the start of the method takes place in a first step S1. Subsequent thereto, leakage monitoring takes place, as well as a check to determine whether an initial evaluation of the data indicates that a leakage is present. In this case, the pressure in the hydraulic brake system is monitored, for example, by means of a pressure sensor. If the pressure drops, initially a leakage is suspected. If the corresponding condition B1 (detection of a possible leakage) is not fulfilled (N), the leakage monitoring is continued. If the condition B1 is fulfilled (Y), however, further conditions are checked. One further condition B2 in the exemplary embodiment is that the vehicle is at a standstill. If this is not the case (N), a confirmation of the suspected leakage takes place in a step S2. If the condition B2 is fulfilled (Y), however, an analysis is carried out to determine whether one further condition B3 is fulfilled, namely whether both brake circuits are affected. A check is therefore carried out to determine whether the suspected leakage is detected in both brake circuits of the hydraulic brake system. In this case, a leakage must be detected in both brake circuits of the diagonal configuration with low time offset. If this is not the case (N), a confirmation of the suspected leakage takes place, in turn, in a step S2. If the condition B3 is fulfilled (Y), however, the suspicion of a leakage is discarded in a step S3. The method therefore leads to the result that the suspected leakage is not an actual leakage, but rather is merely an actuation of the hand brake, or the actuation of the hand brake has caused the measured results which have led to the suspicion of a leakage.

In the case of a diagonal configuration, a leakage must be detected in both circuits with a low time offset according to the aforementioned assumptions. Therefore, a check of the first two points (standstill and both circuits are affected), as shown in FIG. 3, is sufficient for detecting an actuation of a hand brake. This means the condition B3 can be checked more often in a defined time period in order to also cover longer time offsets between the activations of the parking brake actuator.

Figure 4B:
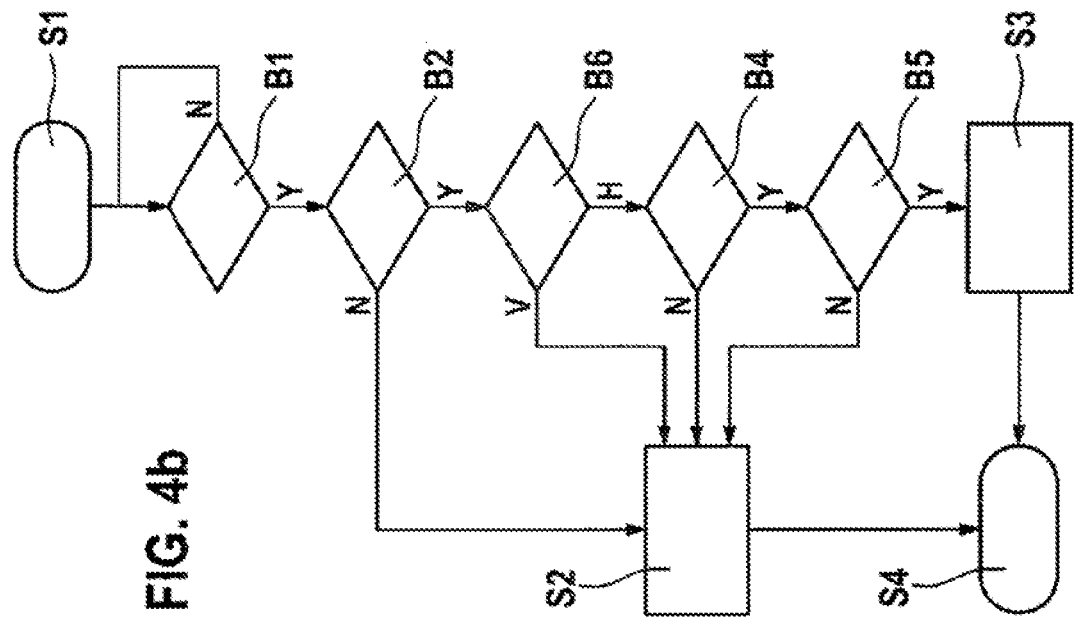
FIG. 4b shows a representation of the method steps in one further embodiment of the disclosure.
Figure 4A:
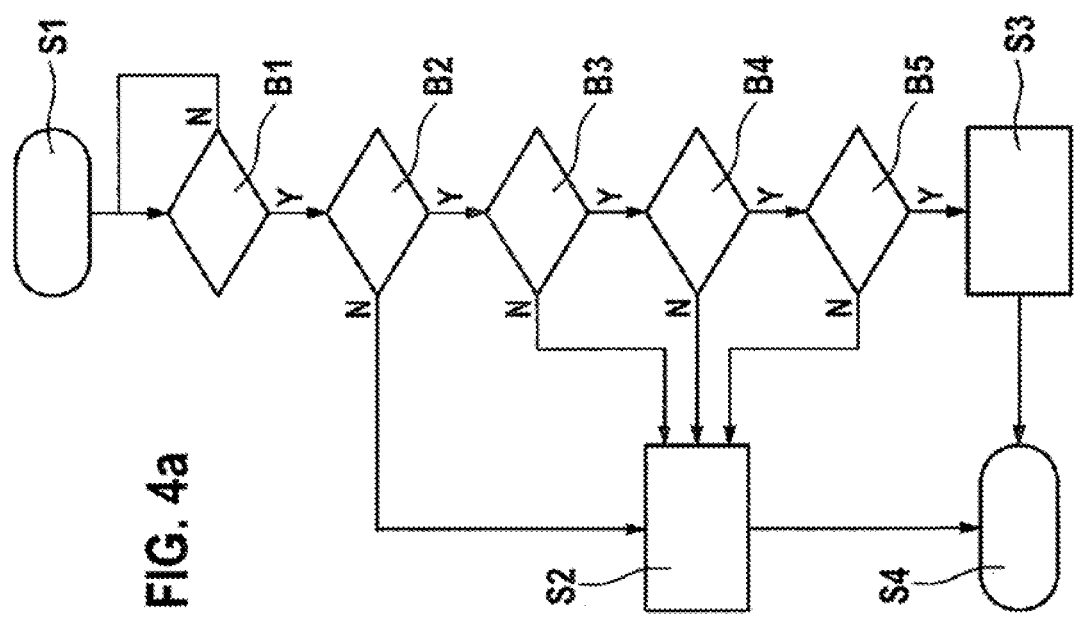
FIG. 4a shows a representation of the method steps in one further embodiment of the disclosure.

FIGS. 4a and 4b also show one representation of the method steps in the case of two further embodiments of the disclosure. In this case, FIG. 4a describes a diagonal configuration again, and FIG. 4b describes a parallel configuration. The steps S1, S2 and S3 correspond to the steps that were already represented in FIG. 3 and should therefore not be discussed further. The same applies for the conditions B1, B2, B3. In addition, further conditions are provided, however.

In the exemplary embodiment of FIG. 4a, for example, if the condition B3 is fulfilled (Y), the suspicion of a leakage is not immediately discarded in the step S3. Instead, a further B4 is checked, namely to determine whether a defined time period has not been exceeded. If this is not the case (N), i.e., if the time period in which the suspected leakage is determined is greater than the defined time period, a confirmation of the suspected leakage takes place in the step S2. If the condition B4 is fulfilled (Y), however, an analysis is carried out to determine whether one further condition B5 has been fulfilled, namely whether the volumetric flow rate of the suspected leakage is constant. If this is not the case (N), a confirmation of the suspected leakage takes place in a step S2. If the condition B5 is fulfilled (Y), however, the suspicion of a leakage is discarded in a step S3.

The exemplary embodiment of FIG. 4b differs from the exemplary embodiment of FIG. 4a in that a condition B6, rather than the condition B3, is investigated. The condition B6 checks for the occurrence of the suspected leakage in the different brake circuits. This exemplary embodiment is relevant, in particular, for vehicles having a parallel brake circuit configuration between the front axle and the rear axle. In the case of a hand brake positioned at the rear axle, if the suspected leakage occurs in the front brake circuit (F), a confirmation of the suspected leakage takes place in the step S2. If the suspected leakage occurs in the rear brake circuit (R), however, an investigation of the further conditions B4 and B5 takes place, as described above.

In one alternative embodiment comprising a hand brake at the front axle, the aspects "front" and "rear" brake circuit of condition B6 are similarly reversed.

What is claimed is:

1. A method for determining a leakage in a hydraulic brake system in a vehicle, the hydraulic brake system including a hydraulic footbrake and an automated hand brake having an electromechanical actuator, the hydraulic footbrake and the automated hand brake configured to act on a brake piston, the method comprising:
   detecting, with at least one first sensor, a suspected leakage in the hydraulic brake system;
   evaluating with a control unit the suspected leakage in the hydraulic brake system based upon the detection;
   detecting with at least one second sensor an actuation of the automated hand brake during the evaluation of the suspected leakage;
   discarding with the control unit the detected suspected leakage based on the evaluation when there is no leakage; and
   at least one of entering an error in an error memory and outputting a message to an operator of the vehicle based on the evaluation when there is leakage in the hydraulic brake system, wherein evaluating with the control unit the suspected leakage in the hydraulic brake system based upon the detection comprises:
   determining with the control unit that no leakage in the hydraulic brake system has occurred when the at least one second sensor detects the actuation of the automated hand brake.

2. The method according to claim 1, wherein detecting with at least one second sensor an actuation of the automated hand brake comprises:
   detecting with the at least one second sensor the actuation of the automated hand brake independently of an activation of the electromechanical actuator of the automated hand brake.

3. The method according to claim 1, wherein detecting with at least one second sensor an actuation of the automated hand brake comprises:
   detecting a displacement of a hydraulic volume.

4. The method according to claim 1, further comprising:
   detecting the actuation of the automated hand brake when a standstill of the vehicle is detected, wherein evaluating with the control unit the suspected leakage in the hydraulic brake system based upon the detection comprises:
   determining with the control unit that no leakage in the hydraulic brake system has occurred when the at least one second sensor detects the actuation of the automated hand brake when the standstill of the vehicle is detected.

5. The method according to claim 1, wherein:
   the at least one first sensor detects a suspected leakage in a first circuit of a diagonal configuration of the hydraulic brake system; and
   evaluating with the control unit the suspected leakage in the hydraulic brake system based upon the detection further comprises:
   determining with the control unit that leakage in the hydraulic brake system has occurred when the at least one second sensor detects a suspected leakage in a second brake circuit of the diagonal configuration of the hydraulic brake system.

6. The method according to claim 1, wherein evaluating with the control unit the suspected leakage in the hydraulic brake system based upon the detection further comprises:

determining with the control unit that leakage in the hydraulic brake system has occurred when the at least one second sensor detects suspected leakage in a brake circuit not assigned to the automated hand brake in a parallel configuration of the hydraulic brake system.

7. The method according to claim 1, wherein evaluating with the control unit the suspected leakage in the hydraulic brake system based upon the detection comprises:
   determining with the control unit that no leakage in the hydraulic brake system has occurred when a period of time of the suspected leakage does not exceed a defined period of time.

8. The method according to claim 1, wherein detecting with at least one second sensor an actuation of the automated hand brake comprises:
   detecting when a volumetric flow rate of the suspected leakage is essentially constant.

9. The method according to claim 1, wherein evaluating with a control unit the suspected leakage in the hydraulic brake system based upon the detection further comprises:
   executing with the control unit a computer program.

10. The method according to claim 9, wherein the computer program is stored on a machine-readable memory medium.

11. The method according to claim 3, wherein the hydraulic volume is in the brake piston.

12. The method according to claim 4, further comprising:
   determining the standstill of the vehicle based on a vehicle speed.

13. The method according to claim 12, wherein the at least one second sensor comprises a plurality of wheel speed sensors.

* * * * *